Dec. 20, 1927.

A. B. SMALL 1,653,515

AUTOMATIC SAFETY LOCK

Filed May 19, 1927

2 Sheets-Sheet 1

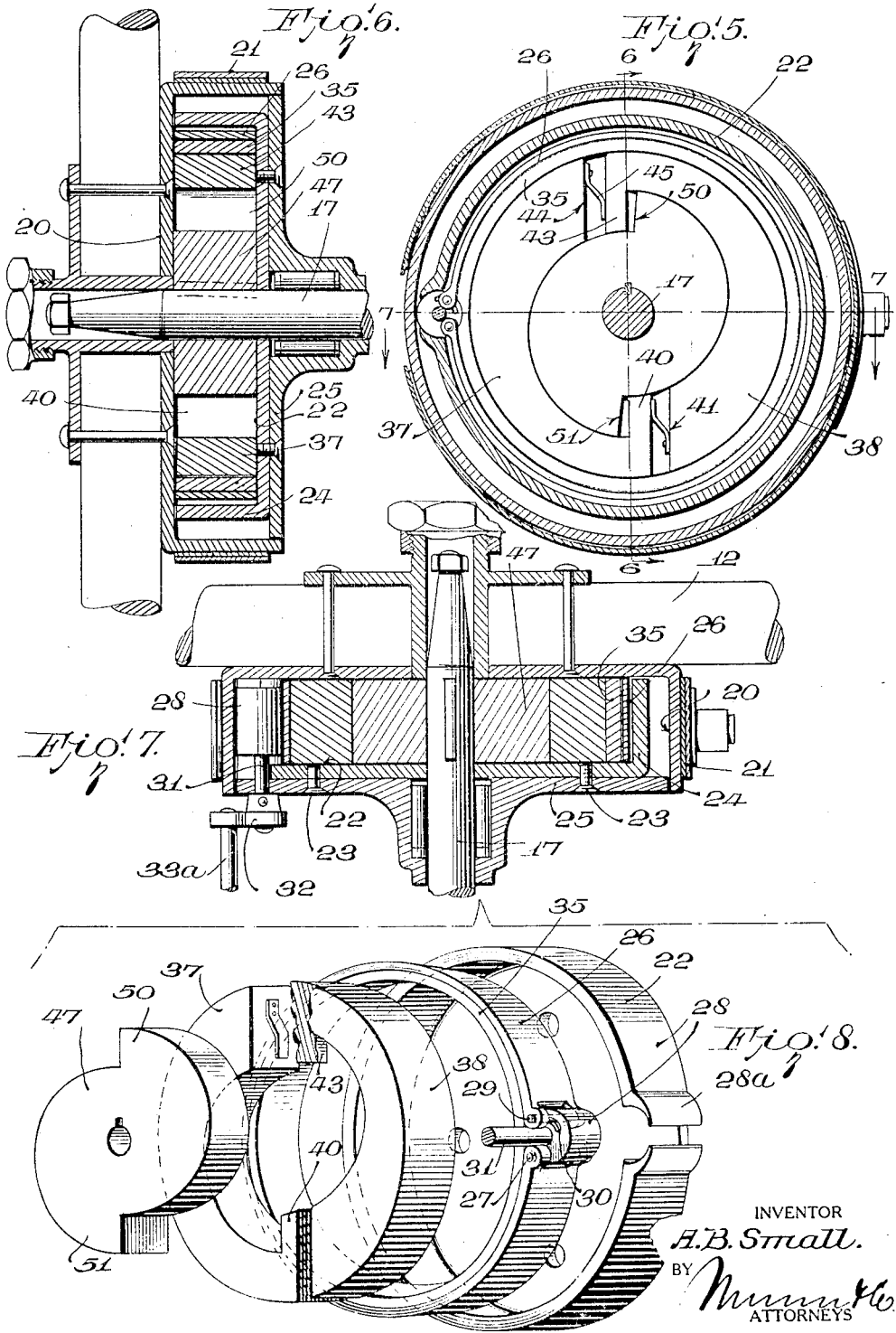

Patented Dec. 20, 1927.

1,653,515

UNITED STATES PATENT OFFICE.

ALFRED BOYD SMALL, OF MIAMI, FLORIDA.

AUTOMATIC SAFETY LOCK.

Application filed May 19, 1927. Serial No. 192,645.

This invention relates to an automatic safety reverse motion lock as described and claimed in my co-pending application, Serial #7,538 filed Feb. 7, 1925 of which the present application forms a continuation in part.

An object of the invention is the provision of a device for normally preventing rotation of the shaft in the opposite direction and while the device may be generally employed, it is particularly adapted for use in connection with motor vehicles, elevators, hoists and in all machines which are movable vertically or horizontally.

A further object of the invention is the provision of a device which may be employed in connection with the drive shaft of an automobile or in connection with the rear axles which will prevent retrograde movement of the vehicle when the same has been dropped on an incline, automatic means being employed to release the braking action to permit forward motion of the vehicle under its own power.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

In the drawings:—

Figure 1 is a plan view of the chassis of an automobile showing my invention applied thereto, Figure 2 is a longitudinal vertical section taken along the line 2—2 of Fig. 1, Figure 3 is a vertical section taken along the line 3—3 of Fig. 1, Figure 4 is a view in perspective of the combined automatic and manually operating device for the safety lock, Figure 5 is a vertical section through the safety device which is applied directly to a vehicle wheel, Figure 6 is a vertical section taken along the line 6—6 of Fig. 5, Figure 7 is a horizontal section taken along the line 7—7 of Fig. 5, and Figure 8 is a view in perspective of the safety device with the elements shown in detached relation.

Referring more particularly to the drawings 10 designates the chassis of an automobile which supports a rear axle housing 11 and a pair of wheels 12 and 13. Intermediate the ends of the chassis is mounted the usual gear shifting casing 14 from which projects a shifting lever 15. This shifting lever is rockably mounted and is adapted to be moved laterally forwardly and rearwardly in order to produce four different speeds of the vehicle. Rotatably mounted in the rear axle housing 11 and driven through the usual differential mounted in the casing 16 are the rear axles, one of which is designated by the numeral 17. These axles are driven through the differential by means of a drive shaft 18 which is connected by the gears with the shaft of the motor 19. The axle is rigidly secured with a wheel 12 whereby the wheel is reversed in the direction indicated by the arrow in Fig. 3. Secured to each wheel, as shown at 20, is a brake drum embraced by the usual brake band 21 and actuated to cause gripping of the brake drum by a series of links connected with the foot pedal or the emergency brake lever located adjacent the seat of the driver.

A cup shaped member 22 is secured at 23 to a closure plate 25 for the brake drum and has an inwardly extending annular flange 24 spaced relative to the annular flange of the brake drum 20. Embracing the flange 24 of the cup shaped member 22 is a split brake band 26 which has one end pivotally connected at 27 to a cam member 28. The other end of the brake band is provided with a pin 29 riding in an arcuately shaped slot 30 of the cam member 28. The cam member 28 is secured to a shaft 31 which in turn is actuated by a lever 32, the free end of the lever being connected to a link 33 which extends forwardly of the vehicle and is slidably mounted in a sleeve 34 which is secured to the rear end of the transmission housing 14.

A ring 35 is mounted in the cup shaped member for rotation and is adapted to be embraced by the brake band 26. This ring is provided with an arcuately shaped transverse bore 36 adapted to be engaged by the cam member 28.

A pair of brake shoes 37 and 38 are mounted within the ring 35. Each brake shoe is provided with a reduced section 39 which is less width than the opposite end and is provided with an upstanding lug 40 maintained in spaced relation with one end 41 of the brake shoe 38 by means of a spring 42. The opposite end of the shoe 38 is also provided with a lug 43 which is spaced from an adjacent end 44 of a shoe 37 and maintained normally in spaced relation by a spring 45 secured to the end 44 of the shoe 37. The portion of the shoe 38 which is adjacent the lug 43 is also reduced as shown at 46, so that the said portion is eccentrically formed relative to the axle 19 as is the portion 39 of the shoe 37.

A double cam member 47 has a cam portion 48 normally seated within the curved reduced portion 46 of the shoe 38. The second cam portion 49 of the member 47 is normally seated within the curved portion 38 of the shoe 37. The member 48 has a lug 50 normally engaging the lug 43 of the shoe 38, while the cam member 49 has a lug or shoulder 51 normally in engagement with the lug 40 of the shoe 37.

The cam member 47 is keyed as shown at 52 to the axle 17. While I have the automatic safety brake to prevent reverse rotation of one axle, it will be seen from the arrows that a separate safety lock is employed in connection with the wheel 13 which operates simultaneously with the safety lock connected with the wheel 12. It will also be appreciated that this safety lock may be applied directly to the drive shaft 18 and will be effective and actuated in the same manner as the locks applied to the wheels for preventing normally retrograde motion of the vehicle.

The link or rod 32 extends forwardly and is received within the sleeve 34 and is provided with a pin 53 adapted to be engaged by one end of a coil spring 54, the other end of the spring being in engagement with the lower end of a bracket 55 which is secured to the rear end of the transmission housing 14. The ends of the pin 53 project through slots 56 located longitudinally and at opposite sides of the sleeve 34 and are adapted to be engaged by the prongs 57 of a yoke 58 formed at an angle to an arm 59 pivotally mounted at 60 in bearings 61 formed integrally with the bracket 55.

Extending upwardly from the pivotal connection of the arm 59 and integrally formed with said arm is a lever 62 having a treadle 63 adapted to be engaged by the foot of the operator of the car. An arm 64 projects forwardly of the lever 62 and is provided with a lug 65 adapted to be engaged by the shifter rod 15 when said rod is moved to the reverse position.

A bell crank lever 70 is connected by a link 71 with one arm of the brake band 21, the other arm being connected at 72 with the other end of the brake band. A spring 73 tends to maintain the ends of the brake band separated in order to prevent any drag on the rear wheels when the automobile is in motion except when the lever 70 is actuated for the application of the brakes.

The operation of my device is as follows:

The brake band 26 is normally tight on the ring 35 and a cam member 28 is in the position shown in Fig. 3 so that the wheels may revolve anti-clockwise and the two shoes 37 and 38 will revolve with the axle 17 on the ring 35. This is true in all the forward speeds and also when the shifting lever 15 is in neutral.

When the shifting lever 15 is moved to the reverse position the lug 65 is engaged by the shifting lever 15 and forced radially, oscillating the lever 62 and the arm 59 whereby the prongs 57 will move downwardly and force the pin 52 towards the transmission housing 14, against the tension of the spring 44 thereby forcing the rod 33 forwardly in the direction indicated by the arrow in Figs. 2 and 3. At this time the cam or eccentric 28 is rocked on the shaft 31 so that the pin 29 will move to the outer end 30ª so that the ends of the brake band 26 will loosen and the ring 35 may slip within the brake band. At this time the wheels will be revolved in the opposite direction to that indicated by the arrow in Fig. 3 so that when the cam members 48 and 49 are revolved and will tend to force the shoes 37 and 38 outwardly from the cam members and be clamped against the walls of the ring 35, said ring which is now free to rotate, will rotate with the cams 48 and 49 and the shoes 37 and 38 so that the automobile may be driven rearwardly under its own power without any interference from the automatic braking mechanism which is adapted to prevent retrograde movement of the vehicle.

However, when the foot pedal 63 is released or the shifting lever 15 is moved to neutral or any one of the other positions except that of reverse a spring 54 will force the rod 33 rearwardly and cause the brake band 26 to tighten on the ring 35 and maintain it against rotation. In this case the retrograde motion of the vehicle will be prevented when the automobile is located on an incline with the forward end of the automobile at a higher elevation than the rear end. Since the brake band 26 maintains the ring 35 against rotation in either direction and in this case principally in the reverse direction the cam members 48 and 49 will cause the shoes 37 and 38 to be jammed within the ring 35 to prevent reverse rotation of the axles 17. Thus it will be seen that if at any time the operator of the machine will stop the machine on an incline when he is driving the vehicle up hill, the vehicle under its own weight and in connection with the braking mechanism attached to each rear axle, will automatically come into play and prevent retrograde motion of the vehicle.

The cam or locking member 28 is rotatably mounted in a bearing 28ᵃ in the drum 22, the socket bearing being formed in the annular flange 24 of said drum. The cam 28 when rocked to released position relative to the idler ring 35 will permit said ring to revolve with the cam 47 and the semicircular mating wedges 37 and 38.

I claim:—

1. A safety reverse motion lock including in combination with a driven shaft, a fixed drum, an idler ring rotatable therein, a rotatable locking member carried by the drum normally locking the ring against turning movement, a cam fixed to the shaft, and means rotatable in one direction with the cam independently of said ring but disposed to coact between the cam and ring for locking the cam against rotation in the opposite direction.

2. A safety reverse motion lock including in combination with a driven shaft, a fixed drum, an idler ring rotatable therein, means for locking said ring against rotation, a cam fixed to the shaft and provided with cam lobes having shoulders at corresponding ends thereof, and a pair of semi-circular mating wedges fitting about said lobes between the cam and said ring and provided with lugs overlying said shoulders, the wedges being rotatable in one direction with the cam independently of said ring but being adapted to coact between the cam lobes and said ring for locking the cam against rotation in the opposite direction.

3. A safety reverse motion lock including in combination with a driven shaft, a fixed drum having a peripheral wall provided with a bearing, an idler ring rotatably fitting within the drum and provided with a socket, a locking member journalled in said bearing and movable to one position to engage in said socket, locking the ring against rotation and to another position freeing the ring, a cam fixed to said shaft, and means rotatable in one direction with the cam, independently of said ring, but disposed to coact between the cam and ring for locking the cam against rotation in the opposite direction.

4. A safety reverse motion lock including in combination with a driven shaft, a fixed drum, a cam and cooperating wedges to coact between the shaft and said drum for locking the shaft against reverse rotation, and an idler ring surrounding the cam and located between the wedges and said drum and releasable for rendering said cam and wedges inoperative.

5. A safety reverse motion lock including in combination with a driven shaft, a fixed element, means to coact between the shaft and said element for locking the shaft against reverse rotation, and a movable element interposed between said means and the fixed element and releasable for rendering said means inoperative.

6. A safety reverse motion lock including in combination with a driven shaft, a fixed drum, an idler ring rotatable therein, means for locking said ring against rotation, a cam fixed to the shaft, and means rotatable in one direction with the cam, independently of said ring, but disposed to coact between the cam and ring for locking the cam against rotation in the opposite direction.

7. A safety reverse motion lock including in combination with a driven shaft, a fixed drum, an idler ring rotatable therein, means for locking said ring against rotation, a cam fixed to the shaft, and a wedge rotatable in one direction with the cam independently of said ring but disposed to coact between the cam and ring for locking the cam against rotation in the opposite direction, said cam and wedge being disposed within the ring.

8. A safety reverse motion lock including in combination with a driven shaft, a fixed drum, an idler ring rotatable therein, a locking member carried by the drum normally locking the ring against turning movement, a cam fixed to the shaft, and means rotatable in one direction with the cam independently of said ring but disposed to coact between the cam and ring for locking the cam against rotation in the opposite direction.

9. A safety reverse motion lock including in combination with a driven shaft, a fixed drum, an idler ring rotatable therein, a locking member carried by the drum for normally locking the ring against rotation, means revolved by the shaft, and wedges rotatably mounted in the ring in one direction and adapted to coact with the means rotated by the shaft for causing said wedges to frictionally engage the ring and prevent rotation of the shaft in one direction, cooperating means on the wedges and the means rotated by the shaft to cause rotation of the wedges and the ring and to permit rotation of the shaft in the opposite direction.

10. In a vehicle having a transmission, a shifting lever for the transmission, a drive shaft for the vehicle, a safety reverse motion lock associated with the drive shaft, a fixed drum, an idler ring rotatable therein, a locking member for the ring and carried by the drum and adapted to be actuated by the shifting lever when moved to the reverse position, a cam fixed to the shaft, mating wedges rotatably mounted in the ring and adapted to be forced normally into frictional engagement with the ring by the cam to prevent rotation of the shaft when the vehicle tends to retrograde, said locking member when moved to an inoperative position by the shifting lever being adapted to permit rotation of the ring and likewise reverse rotation of the shaft.

ALFRED BOYD SMALL.